(12) United States Patent
Toivonen (10) Patent No.: US 7,917,654 B2
(45) Date of Patent: Mar. 29, 2011

(54) EXCHANGING DATA VIA A VIRTUAL FIELD DEVICE

(75) Inventor: Kaj Juhani Toivonen, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 578 days.

(21) Appl. No.: 11/787,061

(22) Filed: Apr. 13, 2007

(65) Prior Publication Data

US 2008/0256174 A1    Oct. 16, 2008

(51) Int. Cl.
*G06F 15/16* (2006.01)
(52) U.S. Cl. ......... 709/248; 709/203; 709/227; 709/246
(58) Field of Classification Search .................. 709/203, 709/227, 248, 246
See application file for complete search history.

(56) References Cited

U.S. PATENT DOCUMENTS

| | | | |
|---|---|---|---|
| 6,052,181 A * | 4/2000 | Maynard et al. ............... 356/147 |
| 2003/0093460 A1* | 5/2003 | Kinney et al. .................. 709/202 |
| 2004/0215701 A1* | 10/2004 | Vrajich .......................... 709/201 |
| 2006/0106879 A1* | 5/2006 | Zondervan et al. ............ 707/200 |
| 2006/0248526 A1* | 11/2006 | Rostampour ..................... 718/1 |
| 2007/0213853 A1* | 9/2007 | Glanzer et al. ................... 700/79 |
| 2008/0034009 A1* | 2/2008 | Freedman et al. ............. 707/201 |
| 2008/0288578 A1* | 11/2008 | Silfverberg .................... 709/203 |

* cited by examiner

*Primary Examiner* — Oanh Duong (57) ABSTRACT

A system for synchronizing data between a host client and a field device comprises a computer system with a virtual field device resident on the computer system. The virtual field device comprises a virtualized instantiation of a portion of a field device. A synchronization manager is also resident on the computer system. The synchronization manager is configured for managing synchronization operations involving the virtual field device. A field client transceiver is coupled with the synchronization manager. The field client transceiver is configured for facilitating data exchange between the virtual field device and the field device during a field client to virtual field device synchronization operation. A host client is also resident on the computer system. The host client is configured for exchanging data with the virtual field device during a host client to virtual field device synchronization operation.

14 Claims, 7 Drawing Sheets

```
┌─────────────────────────────────────────────────────────────┐
│  ESTABLISHING A COMMUNICATION BETWEEN A FIELD CLIENT AND A  │
│  COMPUTER SYSTEM, THE FIELD CLIENT RESIDING ON A FIELD DEVICE. │
│                            310                              │
└─────────────────────────────────────────────────────────────┘
                              ↓
┌─────────────────────────────────────────────────────────────┐
│  ASSOCIATING THE COMMUNICATION WITH A VIRTUAL FIELD DEVICE  │
│  RESIDING ON THE COMPUTER SYSTEM, THE VIRTUAL FIELD DEVICE  │
│  COMPRISING A VIRTUALIZED INSTANTIATION OF THE FIELD DEVICE.│
│                            320                              │
└─────────────────────────────────────────────────────────────┘
                              ↓
┌─────────────────────────────────────────────────────────────┐
│  PERFORMING A SYNCHRONIZATION OPERATION INVOLVING THE VIRTUAL│
│  FIELD DEVICE AND THE FIELD CLIENT, WHEREIN AN EXCHANGE OF DATA│
│  BETWEEN THE VIRTUAL FIELD DEVICE AND THE FIELD DEVICE OCCURS│
│            DURING THE SYNCHRONIZATION OPERATION.            │
│                            330                              │
└─────────────────────────────────────────────────────────────┘
```

RECEIVING A COMMUNICATION FROM A FIELD CLIENT RESIDING ON A FIELD DEVICE, THE COMMUNICATION RECEIVED AT A SYNCHRONIZATION SERVER.
510

ASSOCIATING THE COMMUNICATION WITH A VIRTUAL FIELD DEVICE, THE VIRTUAL FIELD DEVICE COMPRISING A VIRTUALIZED INSTANTIATION THE FIELD DEVICE.
520

IN RESPONSE TO THE COMMUNICATION, SYNCHRONIZING THE VIRTUAL FIELD DEVICE WITH THE FIELD CLIENT SUCH THAT FIELD COLLECTED DATA FROM THE FIELD DEVICE IS REPLICATED WITHIN THE VIRTUAL FIELD DEVICE.
530

TRANSFERRING A SELECTED PORTION OF THE FIELD COLLECTED DATA FROM THE VIRTUAL FIELD DEVICE TO THE HOST CLIENT.
540

RECEIVING A COMMUNICATION AT A SYNCHRONIZATION SERVER FROM A HOST CLIENT, THE COMMUNICATION REGARDING A FIELD DEVICE.
610

↓

ASSOCIATING THE COMMUNICATION WITH A VIRTUAL FIELD DEVICE, THE VIRTUAL FIELD DEVICE COMPRISING A VIRTUALIZED INSTANTIATION OF THE FIELD DEVICE.
620

↓

IN RESPONSE TO THE COMMUNICATION, REPLICATING HOST CLIENT GENERATED INFORMATION WITHIN THE VIRTUAL FIELD DEVICE.
630

↓

TRANSFERRING A SELECTED PORTION OF THE HOST CLIENT GENERATED INFORMATION FROM THE VIRTUAL FIELD DEVICE TO THE FIELD DEVICE DURING A SYNCHRONIZATION OPERATION.
640

```
ESTABLISHING A COMMUNICATION BETWEEN A FIELD CLIENT AND A
SYNCHRONIZATION SERVER, THE FIELD CLIENT RESIDENT UPON A FIELD
DEVICE.
710
```
↓
```
ASSOCIATING THE COMMUNICATION WITH A VIRTUAL FIELD DEVICE
ACCESSIBLE BY THE SYNCHRONIZATION SERVER, THE VIRTUAL FIELD
DEVICE COMPRISING A VIRTUALIZED INSTANTIATION OF THE FIELD DEVICE.
720
```
↓
```
PERFORMING A SYNCHRONIZATION OPERATION INVOLVING THE VIRTUAL
FIELD DEVICE AND THE FIELD CLIENT, WHEREIN AN EXCHANGE OF DATA
BETWEEN THE VIRTUAL FIELD DEVICE AND THE FIELD CLIENT OCCURS
DURING THE SYNCHRONIZATION OPERATION.
730
```

FIG. 7

EXCHANGING DATA VIA A VIRTUAL FIELD DEVICE

BACKGROUND

Presently on field work sites, such as, for example construction sites or areas being surveyed, workers carryout various measurement and data collection functions. For instance, workers utilize survey equipment, total stations, and other measurement instruments such as Global Positioning System (GPS) receivers, to collect data associated with the work site which they are working at. Collectively, the instruments used to survey, measure, control machines and instruments, and collect data associated with a field work site may be referred to as field devices. As a result of this data collection, the workers create data files on the field devices that they use for the data collection functions. Depending on the type of work they are doing, workers might use several different field devices to perform data collection or may use a single field device to collect data at several work sites. Typically, each field device records collected data in some type of a data file. As a result, workers end up with one or more data files which may be on different field devices and have different file formats.

Typically, after such data collection from a field work site, the next step is to have the data processed. To do this, collected data from one or more sources is analyzed and processed to produce results that are based upon various mathematical network adjustments and the like. An example of such processing may be correction for anomalies in a GPS satellite navigation signal. This data processing is not typically performed in the field. One reason is that the data processing often requires special equipment (e.g., fast computers, big display screens, and/or special computer programs), additional data, and/or special operator skill sets that field personnel may not have. Further, it is not productive to have field personnel performing data processing, as their time is better spent collecting more data. Further still, it is likely that the collected data will be used in the office/headquarters for management functions and decision making rather than immediately in the field. Thus, to get the data processed it must be returned to a home office or some other such place where the raw collected data can be analyzed, processed, and/or assimilated.

Presently, field workers typically take their field devices back to the office or work center and download collected data (such as with a memory card or a cable connection) into a computer located in the office. Thus, a common work flow for a surveyor or other worker who collects such data from a field work site is as follows: drive to the office/work center; load work order data on the field device; drive to work site; collect data using the field device; drive back to the office office/work center and download data from field device into an office computer. This is very inefficient, as the worker is essentially transporting the work order and/or the collected data back and forth from the office via vehicle.

Alternatively, in some instances, a worker may copy files from a field device to portable computer that has a wired or wireless connection (such as via cellular telephone) to a network such as the internet. The worker then emails these files back to the office/work center. Likewise a work order may also be emailed to a worker. Email is more efficient and expedient than transferring work orders and/or collected data from place to place via vehicle, but is cumbersome, and error prone since is relies on a field worker to select the proper files, copy them, email them, install them, and/or configure them upon a field device. It is also cumbersome at the office/work center, as a recipient of emailed files will then have to remove the files from an email message and store the files in a proper location or will have to package work order information as attachments to outgoing email messages Thus, a technology for transferring information between an office/work center and a field device which addresses one or more of the above-mentioned inefficiencies or issues would be advantageous.

SUMMARY

A system for synchronizing data between a host client and a field device comprises a computer system with a virtual field device resident on the computer system. The virtual field device comprises a virtualized instantiation of a portion of a field device. A synchronization manager is also resident on the computer system. The synchronization manager is configured for managing synchronization operations involving the virtual field device. A field client transceiver is coupled with the synchronization manager. The field client transceiver is configured for facilitating data exchange between the virtual field device and the field device during a field client to virtual field device synchronization operation. A host client is also resident on the computer system. The host client is configured for exchanging data with the virtual field device during a host client to virtual field device synchronization operation.

BRIEF DESCRIPTION OF THE DRAWINGS

The accompanying drawings, which are incorporated in and form a part of this application, illustrate embodiments of the present technology for exchanging data via a virtual field device, and together with the description, serve to explain the principles of the present technology. Unless noted, the drawings referred to this description should be understood as not being drawn to scale.

DETAILED DESCRIPTION

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope as defined by the appended claims. Furthermore, in the following description, numerous specific details are set forth in order to provide a thorough understanding of the present technology. In other instances, well-known methods, procedures, objects, and circuits have not been described in detail as not to unnecessarily obscure aspects of the present technology.

Notation and Nomenclature

Unless specifically stated otherwise as apparent from the following discussions, it is appreciated that throughout the present detailed description, discussions utilizing terms such as "establishing", "associating", "performing", "resolving", "synchronizing", "presenting", "receiving", "transferring", "initiating", "storing", "utilizing", "sending", "replicating", "establishing", or the like, refer to the actions and processes of a computer system (such as computer system 100 of FIG. 1), or similar electronic computing device. Computer system 100 or similar electronic computing device manipulates and transforms data represented as physical (electronic) quantities within the computer system's registers and memories into other data similarly represented as physical quantities within the computer system memories or registers or other such information storage, transmission, or display devices.

The following discussion sets forth in detail the operation of some example methods of operation of embodiments described herein. With reference to FIG. 3 FIG. 5, FIG. 6, FIG. 7, and flow diagrams 300, 500, 600, and 700, each illustrate example steps used by various embodiments of the present technology. Flow diagrams 300, 500, 600, and 700 include processes that, in various embodiments, are carried out by a processor under the control of computer-readable and computer-executable instructions. The computer-readable and computer-executable instructions reside, for example, in data storage features such as computer usable/readable volatile memory 104, computer usable/readable non-volatile memory 106, or computer useable/readable storage device 118 of (all shown in FIG. 1). The computer-readable and computer-executable instructions, which may reside on computer useable/readable media, are used to control or operate in conjunction with, for example, processor 102 of FIG. 1. Although specific steps are disclosed in flow diagrams 300, 500, 600, and 700, such steps are examples. That is, embodiments are well suited to performing various other steps or variations of the steps recited. It is appreciated that the steps in flow diagrams 300, 500, 600, and 700 may be performed in an order different than presented, and that not all of the steps in flow diagrams 300, 500, 600, and 700 may be performed.

Overview of Discussion

Discussion will begin with a description of an example computer system environment with which, or upon which, embodiments of the present technology may operate. Discussion will proceed to a description of a first example of a system for synchronizing data between a host client and a field device. This first example system for synchronizing data is typically associated with a single computer system. A general description of the operation of this first system for synchronizing data will be provided. Operation of this first system for synchronizing data will then be described in more detail in conjunction with a description of an example method for exchange of data between a field device and a virtual field device.

Discussion will then proceed to a description of a second example of a system for synchronizing data between a host client and a field client. This second example system for synchronizing data is typically associated with a network or server. A general description of the operation of this second system for synchronizing data will be provided. Operation of this second system for synchronizing data will then be described in more detail in conjunction with a description of an example method for transferring field collected data between a field device and a host client, an example method for transferring host client generated information between a host client and a field device, and an example method for exchanging data between a field device and a virtual field device.

Example Computer System Environment

Figure 1:
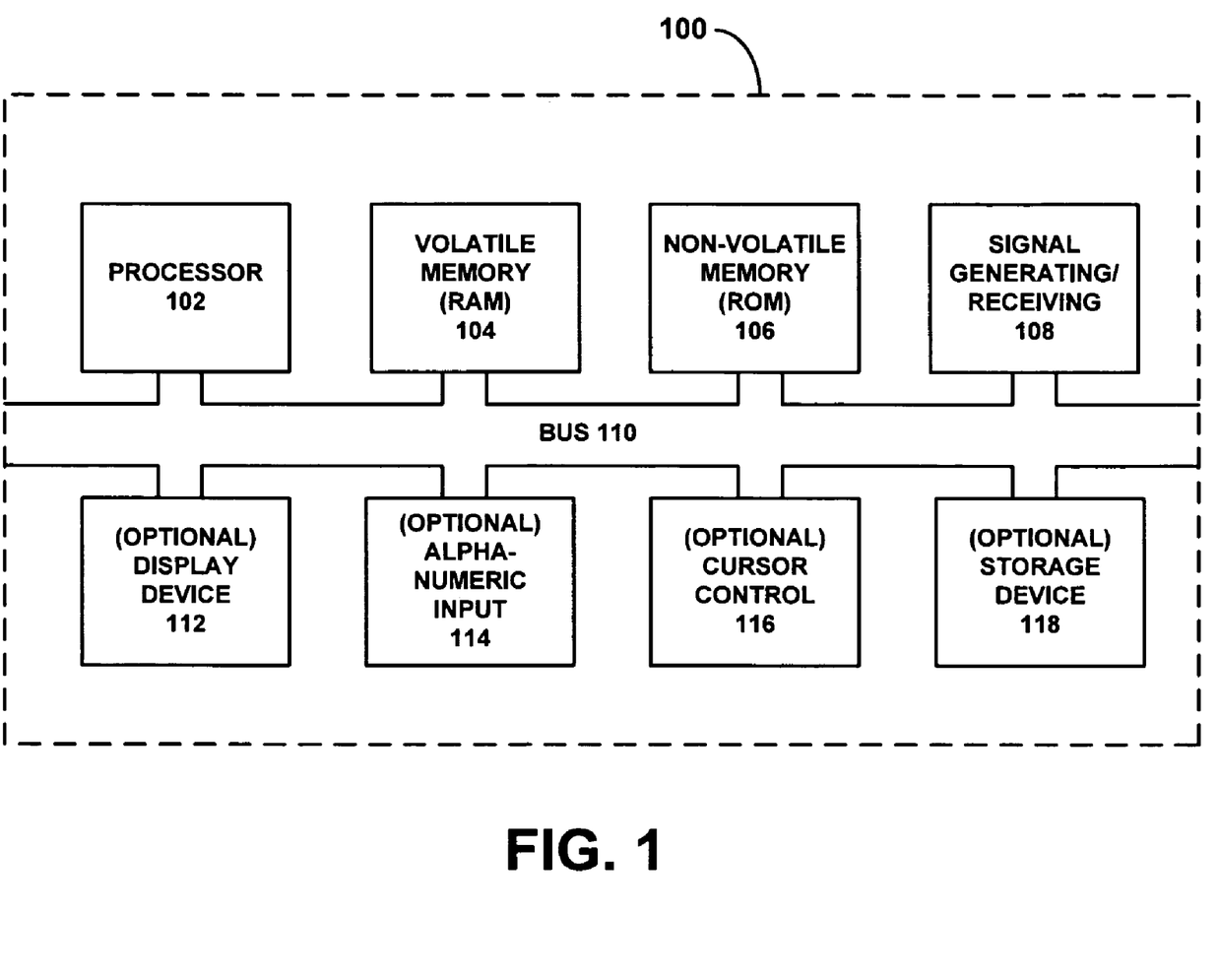
FIG. 1 is a block diagram of an example computer system used in accordance with an embodiment.

With reference now to FIG. 1, a block diagram is shown of an embodiment of an example computer system 100 which may be used in accordance with various embodiments described herein. It should be appreciated that computing system 100 is not strictly limited to being a computer system. As such, computer system 100 of the present embodiment may be well suited to be any type of computing device (e.g., server computer, web server, portable computing device, desktop computer, mobile phone, pager, personal digital assistant, etc.). Within the discussions herein, certain processes and steps are discussed that are realized, in one embodiment, as a series of instructions (e.g., software program) that reside within computer readable memory units and are executed by a processor(s) of computing system 100. When executed, the instructions cause computer system 100 to perform specific actions and exhibit specific behavior that may be described in detail herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. Computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Computer system 100 also includes one or more signal generating and receiving devices 108 coupled with bus 110 for enabling computer system 100 to interface with other electronic devices and computer systems. The communication interface(s) 108 of the present embodiment may include wired and/or wireless communication technology.

Optionally, computer system 100 may include an alphanumeric input device 114 including alphanumeric and function keys coupled to the bus 110 for communicating information and command selections to the central processor(s) 102. Computer system 100 can include an optional cursor control or cursor directing device 116 coupled to the bus 110 for communicating user input information and command selections to the central processor(s) 102. The cursor-directing device 116 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 114 using special keys and key sequence commands. The present embodiment is also well suited to directing a cursor by other means such as, for example, voice commands.

Computing system 100 of FIG. 1 may also include one or more optional computer usable data storage devices 118 such as a magnetic or optical disk and disk drive (e.g., hard drive, floppy diskette, Compact Disk-Read Only Memory (CD-ROM), Digital Versatile Disk (DVD)) coupled with bus 110 for storing information and/or computer executable instructions. An optional display device 112 may be coupled to bus 110 of computing system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

First System for Synchronizing Data Between a Host Client and a Field Device

Figure 2:
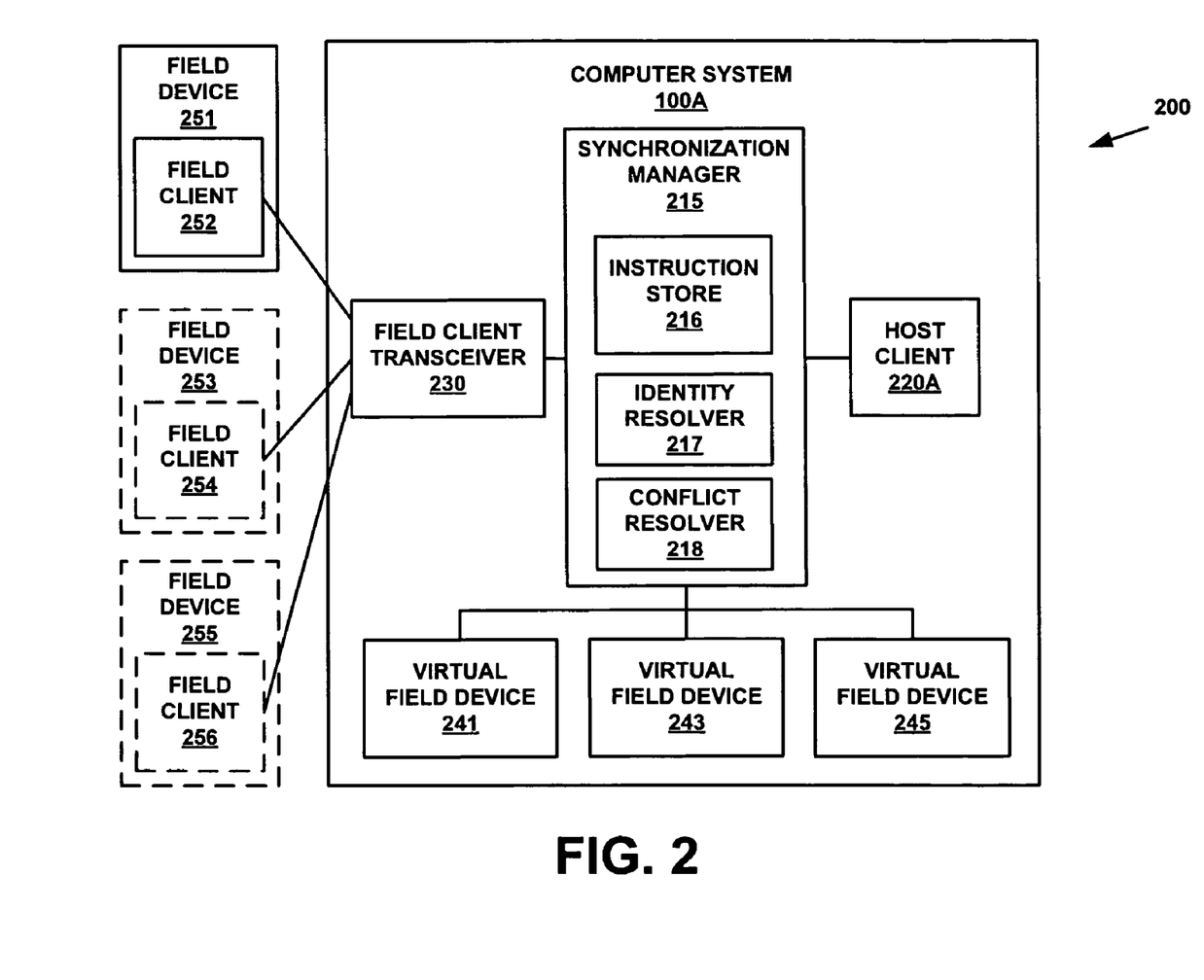
FIG. 2 is a block diagram of an example system for synchronizing data between a host client and a field device, in accordance with one embodiment.

Referring now to FIG. 2, a block diagram is shown of an example system 200 for synchronizing data between a host client and a field device, in accordance with one embodiment. System 200 is comprised of a computer system 100A, which, in one embodiment, is similar in configuration and operation to computer system 100 of FIG. 1. System 200 is further comprised of a host client 220A, a synchronization manager 215, a field client transceiver 230, and at least one virtual field device (e.g., 241, 243, 245). Additionally, in one embodiment, system 200 further comprises a coupling to a field client (e.g., 252, 254, 256) resident upon a field device (e.g., 251, 253, 255), or to a plurality of field clients (e.g., 252, 254, 256) each resident upon one of a plurality of field devices (e.g., 251, 253, 255). Such a coupling between system 200 and a field client (252, 254, 256) may be synchronous, asynchronous, wired (such as via a cable), wireless, direct, indirect (such as through an intermediate computer or device), and/or via a network (e.g., an intranet or the Internet). Additionally such a coupling may be persistently present or intermittently present.

As described herein, a host client, such as host client 220A represents an interface used in an office/work center to receive, analyze, and/or process field collected data which is collected through use of a field device, such as field device 251. Generally, host client 220A is resident on or installed upon a computer system, such as computer system 100A. As described herein, host client 220A exchanges data with a virtual field device, such as virtual field device 241, during a host client 220A to virtual field device 241 synchronization operation. Such data exchange can include sending host client generated information to virtual field device 241 and accessing or receiving field collected data which is maintained on virtual field device 241. In one instance where a plurality of virtual field devices (e.g., 241, 242, and 243) are maintained upon a computer system, host client 220A exchanges data with some or all of the plurality of virtual field devices. Host client 220A is an end-point for data during some synchronization operations.

Some examples of host client generated information include: a work order; a map or map data, typically associated with a work site; a message sent to an operator of a field client, such as field client 252; a software update for a field client, such as field client 252; construction machine control instructions; and/or GIS data. Often, but not always, a work order generated by a host client comprises a collection of files used to enable a worker and/or a field device to collect data from a work site. For example, a work order may instruct a user of a field device, such as field device 251, as to what data needs to be gathered from a work site and may also provide information such as maps, waypoints, surveying data, and GIS overlays which facilitate the use of the field device in collecting field data. A work order may also comprise pre-named and/or pre-configured shell files for storing field data as it is gathered.

If transferred, for example, during a synchronization operation between host client 220A and virtual field device 241, the information which comprises a work order (or other host generated information) is typically stored in appropriate locations, such as in directories, applications, registers, memory, and/or mass storage of virtual field device 241. These locations are synonymous with the locations in which the work order information would be stored upon field device 251. This enables the work order to be stored in the equivalent locations of field device 251 during a subsequent synchronization operation which exchanges data between virtual field device 241 and field device 251.

A field device, such as field device 251, is a device that is used in the field, for example at a work site such as a construction site. Field device 251, for instance, is used to collect data (field collected data) and/or to control the operation of a device, such as a surveying or data collecting device, or a machine, such as a construction machine. Field device 251 is an end-point for data during some synchronization operations. Some examples of a field device include a surveying data collector; a GPS data collector, a total station (used for surveying operations), and a construction machine controller. Field devices 253 and 255 are shown to illustrate an example where system 200 is coupled with, or capable of coupling with, a plurality of distinct field devices. A field device, such as field device 251, is an end-point for data during some synchronization operations.

Some examples of field collected data include: surveying data; geographic information system (GIS) data; Global Navigation Satellite System (GNSS) data, status information regarding a field device; field device use information; memory usage information related to a field device; program version information related to a field device or a field client; and construction machine operation data (such as coordinates, waypoints, or other data collected from operation of a construction machine). As discussed herein, GNSS data may comprise data collected by a data collector or control system configured to receive information from one or more satellite navigation systems, such as: the Magellan satellite navigation system, the Global Positioning Satellite (GPS) satellite navigation system, the Glonass satellite navigation system, and/or a terrestrial augmentation to one or more of these systems. As described herein, the term "construction machine" generally refers to a construction machine used to perform work upon a work site and equipped with a data collector or and/or a controller, such as a machine control system capable of receiving instructions for guiding the use of the construction machine to carry out work operations upon a work site. Some examples of such construction machines include: pavers, graders, dozers, loaders, scrapers, backhoes, trucks, and cranes.

Typically a field device, such as field device 251, will have a field client 252 resident or installed thereon. Field client 252 is software, on the field device side, that enables synchronization and exchange of data between a field device and another device or system, such as system 200. Field client 252, for example, creates a unique identifier for field device 251 so that it can be recognized by a server, synchronization system 200, and/or a host client, such as host client 220A. For example, this unique identifier may comprise a code, such as a serial number, or a name such as "Bob's survey device." In one embodiment, field client 252 incorporates this unique identifier into a communication which it sends from or in regard to field device 251.

Field client 252 also locates and identifies data on field device 251 which will be transferred during a synchronization operation, and likewise automatically stores in appropriate locations upon field device 251 any information received during a synchronization operation. Thus in one example, during a synchronization operation, field client 252 automatically sends out measurement data collected by and resident upon field device 251, and automatically receives and appropriately stores upon field device 251 a work order which was generated by host client 220A and presented for access via virtual field device 241. In this same manner, field client 254 is an example of a field client resident upon field device 253, and field client 256 is an example of a field client resident upon field device 255.

Figure 4:
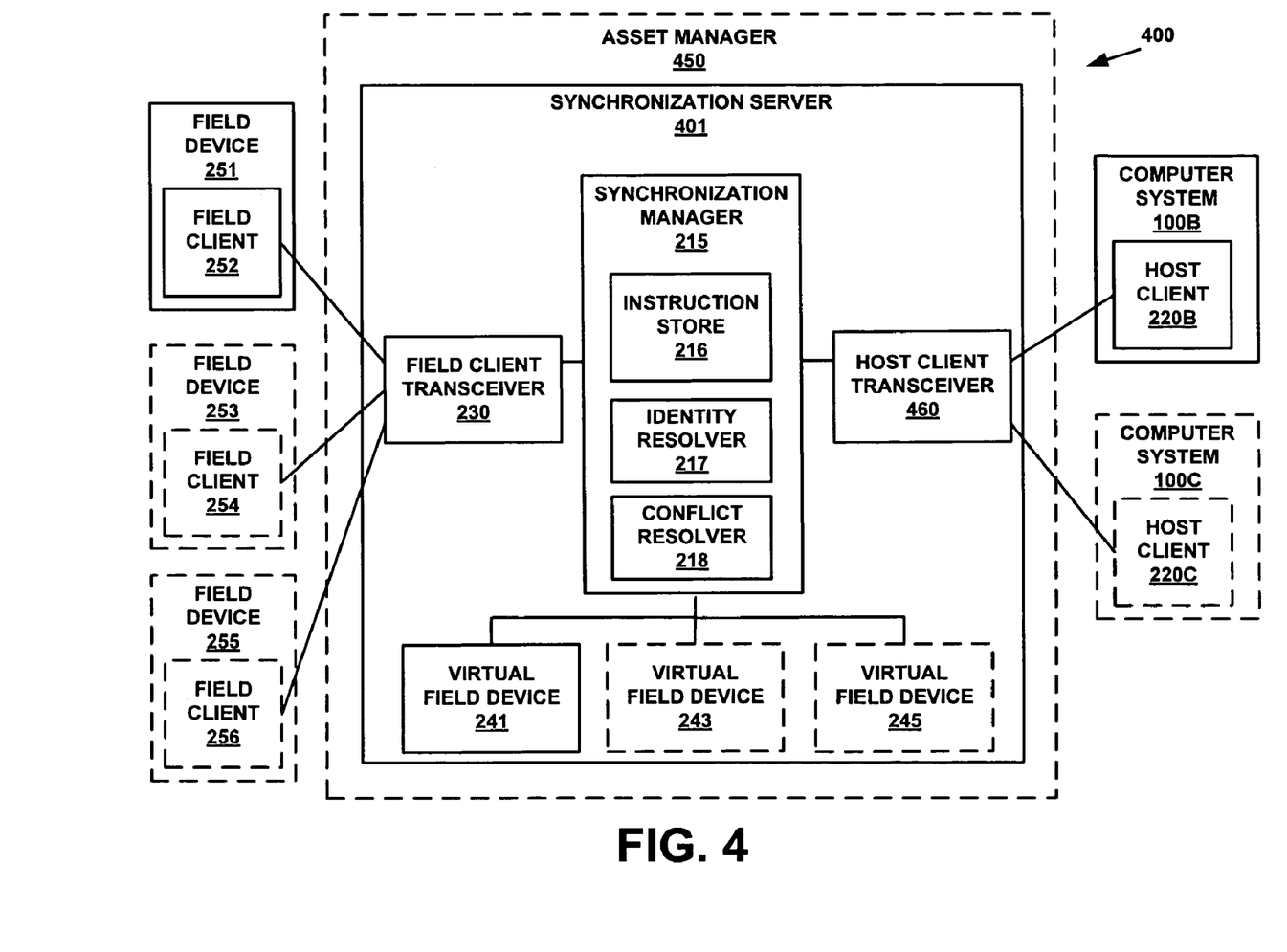
FIG. 4 is a block diagram of an example system for synchronizing data between a host client and a field device, in accordance with one embodiment.

A virtual field device is a virtualized instantiation of all, or a portion of, an actual field device. In some embodiments, a virtual field device, such as virtual field device 241, serves as a transfer node for storing data received from an end-point (a field device or a host client) during a synchronization operation. As used herein terms such as virtual, virtualized, or virtualization refer to the software abstraction of the physical and/or logical resources and components of an actual physical device (or a portion thereof). In some instances, such a software abstraction may be a simulation or emulation of all or portions of a field device. In the embodiments described herein this abstraction is accomplished to create a virtual instance of a field device by using software running on platform separate from the field device, such as on computer system 100A or on synchronization server 401 (FIG. 4).

For example, in one embodiment, virtual field device 241 is resident upon computer system 100A and comprises a virtualized instantiation of all of, or a portion of, the resources and/or components of field device 251. Thus, in one instance, virtual field device 241 comprises a virtualization of some portion of the memory hardware, storage hardware, and/or processing hardware of field device 251, such that host client 220A, is unable to distinguish the difference between coupling with and exchanging data with virtual field device 241 and performing the same coupling and data exchange with actual field device 251. Additionally, in some embodiments, software, such as applications, which are resident upon a field device, may also be resident upon or abstracted as part of a virtual field device, in order to create a more complete virtualization of the field device. Thus, for example, an operating system, an application, and/or field client 252 which are resident upon field device 251, will also be resident upon or abstracted as part of virtual field device 241.

Referring again to FIG. 2, in some embodiments, system 200 comprises multiple virtual field devices, such as virtual field devices 241, 243, and 245. In the example illustrated by FIG. 2, virtual field device 243 is a virtualization of field device 253, and similarly virtual field device 245 is a virtualization of field device 255. An optional configuration of system 200 which comprises multiple virtual field devices (e.g., 241, 243, and 245), allows a single host client 220A to communicate with and exchange data with multiple virtual field devices (e.g., 241, 243, 245) that are virtual instantiations of a plurality of actual field devices (251, 253, 255) with which field client transceiver 230 may optionally be coupled.

As shown in FIG. 2, synchronization manager 215 is resident on computer system 100A. Synchronization manager 215 manages synchronization and data exchange operations involving one or more virtual field devices, such as virtual field device 241, virtual field device 243, and/or virtual field device 245. For example, in one instance, synchronization manager 215 manages a synchronization operation between virtual field device 241 and host client 220A. In another instance, synchronization manager 215 manages a synchronization operation between virtual field device 241 and field client 252.

As shown in FIG. 2, in one embodiment, synchronization manager 215 comprises an instruction store 216 for storing a synchronization instruction. In one instance, such a synchronization instruction governs a field client to virtual field device synchronization operation, such as by causing the synchronization operation to occur at a certain time or by causing a particular data exchange to take place. For example, the synchronization instruction may cause host client generated information on virtual field device 241 to be transmitted via field client transceiver 230 to field client 252. Similarly, a synchronization instruction may cause synchronization manager 215 to prompt field client 252 to retrieve field collected data from field device 251 and transmit the field collected data via field client transceiver 230 to virtual field device 241. In another example, a synchronization instruction may direct synchronization manager 215 to send a confirmation of successful synchronization to a field client. In such an example, upon receiving a notification of successful synchronization, field client 252 would be alerted that any field collected data transmitted out from field device 251 during the synchronization operation could be safely deleted, and similarly that any host client generated information received during the synchronization operation could be safely posted to field device 251.

As shown in FIG. 2, in one embodiment, synchronization manager 215 comprises an identity resolver 217 for associating a received field client communication with a particular virtual field device of a plurality of virtual field devices. This is useful when system 200 is utilized to couple with more than one distinct field device. In one instance, identity resolver 217 determines which virtual field device to direct a received field communication to by decoding unique field client specific identification information contained in the communication. Such decoding, can be accomplished, by using a lookup table or a function which correlates unique field device identification information with a virtual field device that is a virtual instantiation of a particular field device. For example, when a received field client communication includes a unique identifier associated with field device 251, identity resolver 217 resolves the identity of field device 251 and then directs the field client communication to virtual field device 241. In some embodiments, identity resolver 217 also associates a received host client communication with a particular virtual field device. For example, when a received host client communication includes a unique identifier associated with field device 251, identity resolver 217 resolves the identity of field device 251 and then directs the host client communication to virtual field device 241.

As shown in FIG. 2, in one embodiment, synchronization manager 215 comprises a conflict resolver 218, for resolving a conflict, due to a co-located file or a mutually updated co-located file. For example, such a conflict may occur during a synchronization operation between the entities of host client 220A and virtual field device 241, if each contains a copy of a file which is being synchronized. Likewise, such a conflict may occur during a synchronization operation between the entities of field client 252 and virtual field device 241, each contains a copy of a file which is being synchronized. Typically during a synchronization operation, a file comparison between entities being synchronized takes place. In one embodiment, this file comparison is performed by synchronization manager 215. If a file exists on one entity, but not the other, the file is replicated upon the other entity. If a file exists on both entities, but has the same file metadata in both locations (e.g., file size, creation date, modification date) then the file is not transferred between the entities. If a file exists on both entities, but has different metadata in both locations then conflict resolver 218 implements conflict resolution rules to resolve the problem.

In one embodiment, conflict resolver 218 implements one or more automatic rules, as appropriate for the conflict situation, in order to resolve a conflict due to a co-located file. For example, in one embodiment, if the co-located located file is a host client generated file, then a host client generated file sent from or received from the host client will always take precedence. Similarly, in one embodiment, if the file is a field gathered data file, then a field gathered data file sent from or received from a field client always takes precedence. In one embodiment, the newest file (according to file metadata) always takes precedence. In another embodiment, conflict resolver 218 sends a notification to a user and allows a user to intervene and manually resolve the conflict. In another embodiment, conflict resolver 218 analyzes the contents of the conflicting files to determine if they may be merged together without corrupting data. If so, conflict resolver 218 merges the two conflicting files via an intelligent merge process, such that a merged file is created and then stored upon each of the entities being synchronized. This is often useful in an instance where a partial file may exist on one entity as a result of an unsuccessful or incomplete synchronization or data exchange.

As shown in FIG. 2, field client transceiver 230 is resident on computer system 100A. Field client transceiver 230 coupled with synchronization manager 215 and is used to couple with one or more field clients. Field clients 252, 254, and 256 are examples of such field clients that field client transceiver 230 may couple with. During a field client to virtual field device synchronization, field client transceiver 230 couples with a field client and facilitates data exchange by sending and receiving exchanged data. Such exchange of data is managed by synchronization manager 215. For example, in one embodiment, when field client transceiver 230 is coupled with field client 252, field client transceiver 230 facilitates the exchange of data between virtual field device 241 and field device 251 during a field client to virtual field device synchronization operation. This means that field client transceiver 230 may operate to direct data to field device 251 via field client 252 and/or receive data from field device 251 via field client 252. It should be appreciated that, in some embodiments, the functionality of field client transceiver 230 may be incorporated into other components of system 200, such as synchronization manager 215.

Exchanging Data Between a Field Device and a Virtual Field Device

In one embodiment, for example, a synchronization operation between system 200 and a field client is used to transfer field collected data from a field device, such as field device 251, to its corresponding virtual field device (virtual field device 241). System 200 then presents the field collected data to host client 220A for access, via virtual field device 241. Because virtual field device 241 is a virtualization of field device 251, host client 220A accesses and communicates with virtual field device 241 as if communications are being carried out with field device 251. In one instance, for example, the field collected data is transferred from virtual field client 241 to host client 220A during a synchronization operation between host client 220A and virtual field client 241.

Similarly, in one embodiment, a synchronization operation involving system 200 is used to transfer host client generated information from host client 220A to virtual field device 241. This host client generated information is then made available to download from virtual field device 241 during a synchronization operation between system 200 and field client 252. For example, field client 252 receives the host client generated information which is stored on virtual field device 241, and automatically stores the received host client generated information upon field device 251 in appropriate locations (e.g., the same locations in which the host client generated information was stored upon within virtual field device 241).

Figure 3:
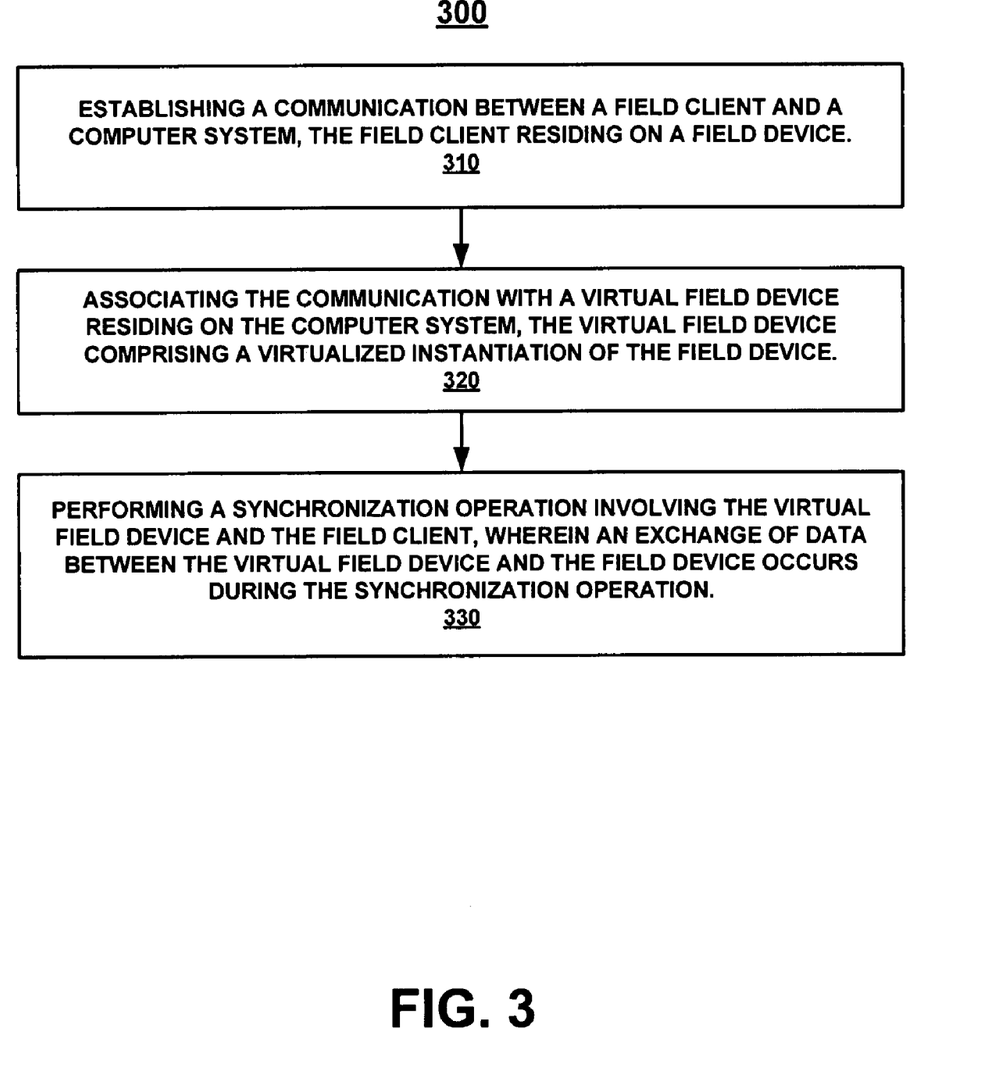
FIG. 3 is flow diagram of an example method for exchange of data between a field device and a virtual field device, in accordance with one embodiment.

FIG. 3 illustrates a flow diagram 300 of an example method for exchange of data between a field device and a virtual field device, in accordance with one embodiment. The method of flow diagram 300 utilizes system 200 to affect the exchange of data between a field device and a virtual field device. Such data exchange is typically automated and seamless from a user's perspective, and thus requires little or no involvement from a user. An example exchange of data between field device 251 and virtual field device 241 will be described below to illustrate the exchange of data which takes place, in some embodiments, utilizing the method described by flow diagram 300.

At 310 of flow diagram 300, in one embodiment, a communication is established between a field client and a computer system. The field client is associated with or resides upon a field device. For example, in one embodiment, a communication is established between field client 252 and computer system 100A. Thus as described above, this communication comprises a coupling between field client 252 and synchronization manager 215 via field client transceiver 230. This communication can be established manually, periodically, or automatically.

One example of a manual establishment of this communication occurs when a user selects or initiates a synchronization operation, such as by selecting a "sync" icon or function via software running upon field device 251. Another example of a manual establishment of this communication occurs when a user depressing a "sync" button physically located upon field device 251. If a pathway for exchanging data between computer system 100 and field device 251 is available, then communication is established. If such a pathway between computer system 100A and field device 251 is not present prior to the initiation of this manual establishment of communication, a user may also manually establish this pathway, such as by connecting a cable between field device 251 and computer system 100A or by connecting field device 251 to an internet connection by over which communication with computer system 100A may be conducted. Optionally, field client 252 may automatically attempt to establish this pathway as a result of the manual initiation of the establishing of communication. For example, field client 252 may attempt to wirelessly couple to computer system 100A (such as via a Bluetooth communication channel, via a wireless networking communication protocol, or via cellular telephony).

One example of a periodic establishment of this communication occurs when a communication between field device 251 and computer system 100A is established at preset times. In one instance, synchronization manager 215 establishes, or attempts to establish, a communication with field device 251 at one or more preset times or upon some periodic interval. Such preset communication may be in accordance with instructions maintained in instruction store 216. Such instructions may be default or user configured. In another instance, field client 252 establishes, or attempts to establish a communication with computer system 100A at a preset time or upon some periodic interval. Such a preset time or interval may exist as a default setting or user configured setting of field client 252.

One example of an automatic establishment of this communication occurs when a connection (signal pathway for exchanging data) is detected between field device 251 and computer system 100. In one instance, synchronization manager 215 automatically establishes the communication upon detection of this connection. In another instance, field client 252 automatically establishes this communication upon detection of the connection.

At 320 of flow diagram 300, in one embodiment, the communication is associated with a virtual field device residing on the computer system. The virtual field device that the communication is associated with comprises a virtualized instantiation of the field device with which the communication has been established. The previous example, where a communication has been established between field client 252 and computer system 100A, will be utilized to illustrate this action. For instance, in one embodiment, synchronization manager 215 associates this communication with virtual field device 241, because virtual field device 241 is a virtualized instantiation of field device 251.

In an instance, where the communication is initiated by synchronization manager 215, synchronization manager automatically associates the initiated communication with the proper virtual field device. In another instance, where the communication is initiated from a field device, synchronization manager 215 resolves the identity of the field device, if required (such as if synchronization manager has been configured to couple with a plurality of field devices). For example, consider an embodiment, where a communication between computer system 100A and field client 252 is initiated from field client 252. Synchronization manager 215 employs identity resolver 217 to resolve the identity of the field device from which the communication originated or is regarding. In a manner previously described, identity resolver 217 utilizes unique identifier information in a communication received from field client 252 to properly identify field device 251. Based upon the identification of field device 251, identity resolver 217 and synchronization manager 215 associate the communication with virtual field device 241. This is particularly useful in an embodiment where virtual field device 241 is one of a plurality of virtual field devices (e.g., 241, 243, 245) residing on computer system 100A.

At 330 of flow diagram 300, in one embodiment, a synchronization operation is performed. The synchronization operation involves the virtual field device and the field client which are associated with a communication between the field client and the computer system. In one embodiment, an exchange of data between the virtual field device and the field device occurs during the synchronization operation. For instance, following the ongoing example, a synchronization operation involving field client 252 and virtual field device 241 will take place. During this synchronization operation, an exchange of data between virtual field device 241 and field device 251 may take place, if data such as host client generated information or field collected data exists to be exchanged.

In one embodiment, for example, the synchronization operation comprises synchronizing virtual field device 241 with field client 252 such that field collected data resident on field device 251 is replicated within virtual field device 241.

In such an instance, synchronization manager 215 analyzes information (and metadata of the information) on both field device 251 and virtual field device 241 to determine what, if any, information and/or files need be exchanged to affect a synchronization of the data upon field device 251 with the data upon virtual field device 241. Synchronization manager 215 resolves any conflicts which arise by utilizing conflict resolver 218. As previously described, such a conflict may arise, for example, due to a co-located or mutually updated co-located file residing on both virtual field device 241 and field device 251. Finally, synchronization manager 215 directs the exchange of information between field device 251 and virtual field device 241 such that field collected information stored upon field device 251 is stored identically upon virtual field device 241.

At this point, in one embodiment, the field collected data stored on virtual field device 241 is presented for access such that that field collected data is accessible to host client 220A of computer system 100A. This presentation may comprise simply storing the field collected data upon virtual field device 241 such that it can be accessed at any time by host client 220A. This presentation may further comprise sending a notification message to host client 220A, or to a user of host client 220A. Additionally, in one embodiment, synchronization manager 215 may automatically initiate a communication with host client 220A so that a synchronization operation involving host client 220A and virtual field device 241 can be undertaken to transfer the field collected data to host client 220A.

It should be appreciated, that part of a synchronization operation involving field client 252 and virtual field device 241 may also comprise synchronizing data between field device 251 and virtual field device 241 such that updated information on virtual field device 241 is sent to field device 251. Typically, such updated information takes the form of host client generated information which is provided to virtual field device 241 by host client 220A. As previously described, in one instance the host client generated information may be in the form of a work order. After such host client generated information is sent from virtual field device 241 to field client 252, field client 252 automatically stores the received information in the proper locations upon field device 251. In one embodiment, for example, field client 252 accomplishes this by storing the received information in a location (e.g., within a memory, register, file, storage location, and/or application) of field device 251 which corresponds to the location that such information was stored at within virtual field device 241.

Second System for Synchronizing Data Between a Host Client and a Field Device

Referring now to FIG. 4, a block diagram is shown of an example system 400 for synchronizing data between a host client and a field device, in accordance with one embodiment. With respect to FIG. 4, field devices 251, 253, and 255, and field clients 252, 254, and 256 are the same as previously described in conjunction with FIG. 2. System 400 is comprised of a synchronization server 401, which, in one embodiment, is similar in configuration and operation to computer system 100 of FIG. 1. System 400 is further comprised of a synchronization manager 215, a field client transceiver 230, a host client transceiver 460, and at least one virtual field device (e.g., 241, 243, 245). In one embodiment, system 400 also comprises a coupling to one or more host clients (220B, 220C) and/or a coupling to one or more field clients (e.g., 252, 254, 256). For example, host client transceiver 460 is typically coupled to or couplable with at least one host client, such as host client 220B. Similarly, field client transceiver is typically coupled to or couplable with at least one field client, such as field client 252. Such a coupling between system 400 and a field client (252, 254, 256) and/or a host client (220B, 220C) may be synchronous, asynchronous, wired (such as via a cable), wireless, direct, indirect (such as through an intermediate computer or device), and/or via a network (e.g., an intranet or the Internet). Additionally such a coupling may be persistently present or intermittently present.

As shown in FIG. 4, synchronization server may be a component of an asset manager 450 which is utilized generally to aggregate, process, and manage data sent to and received from a plurality of assets such as field devices, other data collection devices, and/or control/monitoring devices coupled to construction machines or other assets at one or more work sites or other locations. In some embodiments, asset manager 450 may also be configured for generating reports related to or incorporating data sent to or received from one or more of the plurality of assets.

In various embodiments, synchronization server 401 may be a web server, a file server, or a collection servers. Implementing system 400 upon synchronization server 401, rather than upon a computer which is co-located with a host client facilitates maintaining and/or accessing one or more virtual field devices independently of the computer systems (100B, 100C) upon which host clients are located. This enables a plurality of host clients to access a virtual field device with greater ease than was offered by system 200 of FIG. 2. As compared to system 200, system 400 also decouples the availability of the host client's computer systems (100B, 100C) from synchronization operations between a virtual field device and a field client. Consider for example, an instance where synchronization server 401 is operated twenty-four hours per day. Synchronization operations between field client 252 and virtual field device 241 may take place at any time of day, regardless of whether a host client computer system (100B, 100C) is switched on or available.

With respect to system 400, a virtual field device comprises a virtualized instantiation of a portion of a field device. Each virtual field device (241, 243, 245) operates substantially in the same manner as previously described herein, except that it is accessible by synchronization server 401. This means that a virtual field device, such as virtual field device 241, may reside upon synchronization server (as shown). This also means that a virtual field device, such as virtual field device 241, may reside in a location apart from synchronization server 401 as long as it is accessible to synchronization server 401. As previously described, virtual field device 241 is a virtualization of field device 251, virtual field device 243 is a virtualization of field device 253, and virtual field device 245 is a virtualization of field device 255. Thus, in one embodiment, system 400 comprises a plurality of virtual field devices (e.g., 241, 243, 245) accessible by the synchronization server, and each of the plurality of virtual field devices comprises a virtualized instantiation of one of a plurality of field devices (e.g., 251, 253, 255).

With respect to system 400, synchronization manager 215 manages synchronization operations involving one or more virtual field devices (241, 243, 245) which are accessible to synchronization server 401. As utilized in system 400, synchronization manager 215 operates substantially in the manner as previously described in conjunction with system 200, except that synchronization manager 215 is now coupled with or resident upon synchronization server 401 and now communicates with one or more host clients (e.g. 220B, 220C) via host client transceiver 460. In one embodiment, synchronization manager 215 is comprised of instruction store 216, identity resolver 217, and/or conflict resolver 218.

Instruction store 216, as previously described, is for storing one or more synchronization instructions, which govern field client to virtual field device synchronization operations. Additionally, instruction store may also store one or more synchronization instructions, which similarly govern host client to virtual field device synchronization operations.

Identity resolver 217, operates in a manner similar to the previous description in conjunction with system 200, and is for associating a received field client communication with a particular virtual field device of a plurality of virtual field devices which are accessible by synchronization server 401. Additionally, in a manner previously described, in one embodiment, identity resolver 217 is further configured for associating a received host client communication with a particular virtual field device of a plurality of virtual field devices accessible by synchronization server 401.

Conflict resolver 218, as previously described, is for resolving a conflict occurring during a synchronization operation, such as a host client to virtual field device synchronization operation or a field client to virtual field device synchronization operation. Such a conflict may be due, for example, to a co-located or mutually updated co-located file being present on both a host client and a virtual field device which are being synchronized. Additionally, such a conflict may be due, for example, to a co-located or mutually updated co-located file being present on both a field device and a virtual field device which are being synchronized.

With respect to system 400, field client transceiver 230 is resident upon synchronization server 401 and coupled with synchronization manager 215. Field client transceiver 230 is for facilitating data exchange between a virtual field device, such as virtual field device 241, and a field device, such as field device 251, during a field client to virtual field device synchronization operation. Field client transceiver 230 operates in substantially the same manner as was previously described in conjunction with system 200, and in the interests of brevity and clarity, this operation will not be re-described herein. It should be appreciated that, in some embodiments, the functionality of field client transceiver 230 may be incorporated into other components of system 400, such as synchronization manager 215.

As shown in FIG. 4, host client transceiver 460 is resident on synchronization server 401 and is for facilitating data exchange between a virtual field device, such as virtual field device 241 and host client, such as host client 220B or host client 220C, during a host client to virtual field device synchronization operation. Such exchange of data is managed by synchronization manager 215. For example, in one embodiment, when host client transceiver 460 is coupled with host client 220B, host client transceiver 460 facilitates the exchange field collected data and/or host client generated information between virtual field device 241 and host client 220B during a host client to virtual field device synchronization operation. This means that field client transceiver 230 may operate to direct data to host client device 220B and/or receive data transmitted from host client 220B. It should be appreciated that, in some embodiments, the functionality of host client transceiver 460 may be incorporated into other components of system 400, such as synchronization manager 215.

Transferring Field Collected Data Between a Field Device a Host Client

Figure 5:
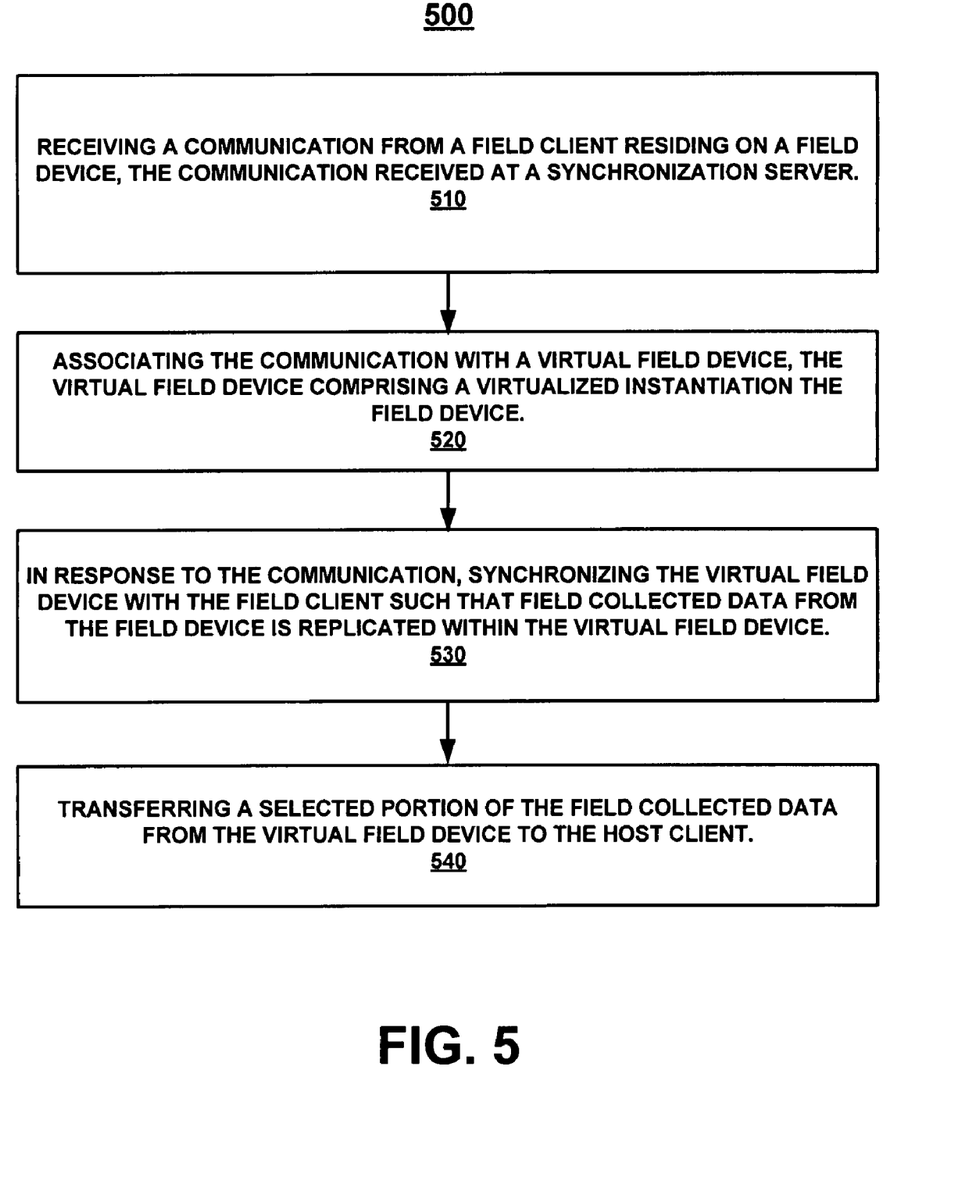
FIG. 5 is a flow diagram of an example method for transferring field collected data between a field device and a host client, in accordance with one embodiment.

FIG. 5 is a flow diagram 500 of an example method for transferring field collected data between a field device and a host client, in accordance with one embodiment. The method of flow diagram 500 utilizes system 400 to affect the exchange of field collected data between a field device and a host client. Such data exchange is typically automated, and requires little or no involvement from a user. An example exchange of data between field device 251 and host client 220B will be described below to illustrate the exchange of data which takes place, in some embodiments, utilizing the method described by flow diagram 500.

At 510 of flow diagram 500, in one embodiment, a communication is received from a field client. The field client resides on or is associated with a field device. The communication is received at a synchronization server. For example, in one embodiment, a communication from field client 252 is received by field client transceiver 230 of synchronization server 401. The communication from field client 252 may be initiated manually, periodically, or automatically as previously described in conjunction with system 200. The field client which the communication is received from may be resident on, or associated with, a field device such as: a surveying data collection instrument, a geographic information system (GIS) data collection instrument, a global navigation satellite system (GNSS) data collection instrument, a construction machine control system, and/or any other field device described herein.

In one embodiment, receiving the communication, as described in 510 of flow diagram 500, also comprises receiving identification information associated the field device that the sending field client is resident on or associated with. Thus, in one embodiment, a communication received from field client 252 includes a unique identifier associated with field device 251. This unique identifier can be a code, or even a name, such as "Bob's surveying device," which is associated with the field device. This is useful when field client transceiver 230 and system 400 are coupled to, or are capable of coupling with, a plurality of field clients which are associated with or resident upon a plurality of field devices. As will be further described, the unique identifier information is used to associate a communication with the proper virtual field device.

At 520 of flow diagram 500, in one embodiment, the received communication is associated with a virtual field device. The virtual field device, which the received communication is associated with, comprises a virtualized instantiation the field device which the sending field client resides upon or is associated with. In the previous example, a communication was sent from field client 252 and received by synchronization server 401. At 520 of flow diagram 500, synchronization manager 215 associates this received communication with virtual field device 241, because virtual field device 241 is the virtualized instantiation of field device 251.

In one embodiment, synchronization manager 215 "associates" a received communication by resolving an identity of the field device which the communication regards or originated from. For example, in one instance, synchronization manager 215 utilizes identity resolver 217 to analyze unique identifier information included with the received communication. In a manner previously described, identity resolver 217 identifies a field device which the communication regards or originated from and correlates this field device with a virtualized instantiation of that field device. Based upon this identity, synchronization manager 215 then associates the communication with the proper virtual field device. Typically, this comprises associating the received communication with one of a plurality of unique virtual field devices which are accessible by synchronization server 401. In one embodiment, upon associating the received communication, a synchronization operation is initiated. The synchronization operation is described in 530 of flow diagram 500, and may be initiated by the field client which sent the received communication or may be initiated automatically by synchronization manager 215.

At 530 of flow diagram 500, in one embodiment, in response to receiving the communication, the virtual field device undergoes a synchronization operation with the field client, such that field collected data from the field device is replicated within the virtual field device. Thus, following the previous example, in one embodiment synchronization manager 215 automatically initiates a synchronization operation between field client 252 and virtual field device 241 such that field collected data resident upon field device 251 is replicated in like locations within virtual field device 251. In one embodiment, this synchronization operation may also be initiated by field client 252.

In one particular instance, for example, the synchronization operation comprises receiving field collected data from field client 252. In one embodiment, for example, the field collected data comprises measurement data, such as: survey data, map data, or GNSS satellite data. This measurement data may comprise field collected data that has been collected with field device 251 at one or more work sites, for instance in conjunction with instructions in a work order.

After the field collected data is received, synchronization manager 215 directs the field collected data to be stored upon virtual field device 241 in the same locations as which the field collected data is stored upon field device 251.

Once the field collected data is stored on virtual field device 241, it is presented for access. This can comprise allowing a host client such as host client 220B or host client 220C to access the field collected data via virtual field device 241 as if the particular host client is actually accessing the field collected data from field device 251. In one embodiment, presenting the field collected data for access comprises synchronization manager 215 sending a message to a user or to a host client as a notification that field collected data is available for access via virtual field device 241. In another embodiment, presenting the field collected data for access comprises initiating, or attempting to initiate, a host client to virtual field device synchronization operation so that all of, or a portion of, the received field collected data may be transferred to the host client. Such a synchronization operation may be initiated automatically upon receiving new field collected data or in conjunction with a synchronization instruction contained in instruction store 216.

Referring again to 530 of flow diagram 500, in one embodiment, the synchronizing operation further comprises utilizing the synchronization server to send host client generated information from the virtual field device to the field client. Such host client generated information may comprise: a work order, a message sent to an operator of the field device, a software update for the field device, a map, or other host client generated information as described herein.

With continued reference to 530 of flow diagram 500, in one embodiment, if the synchronizing of the virtual field device with the field client is successfully accomplished, a confirmation of a successful synchronization is sent from the synchronization server to the field client. In such an example, upon receiving a notification of successful synchronization from synchronization manager 215, field client 252 would be alerted that any field collected data transmitted out from field device 251 during the synchronization operation could be safely deleted, and similarly that any host client generated information received could be safely posted to field device 251.

At 540 of flow diagram 500, in one embodiment, a selected portion of the field collected data which as been replicated upon the virtual field device is transferred from the virtual field device to a host client. Thus, following the previous example, a selected portion of the field collected data, which has been replicated upon virtual field device 241, is transferred to a host client, such as host client 220B. In one embodiment, synchronization manager 215 automatically transfers this selected portion of field collected data to the host client, for example, in accordance with a synchronization instruction maintained in instruction store 216. In another embodiment, synchronization manager 215 transfers this selected portion of field collected data in response to a host client, such as host client 220B or host client 220C, requesting the selected portion of the field collected data from field device 251 or from virtual field device 241.

Figure 6:
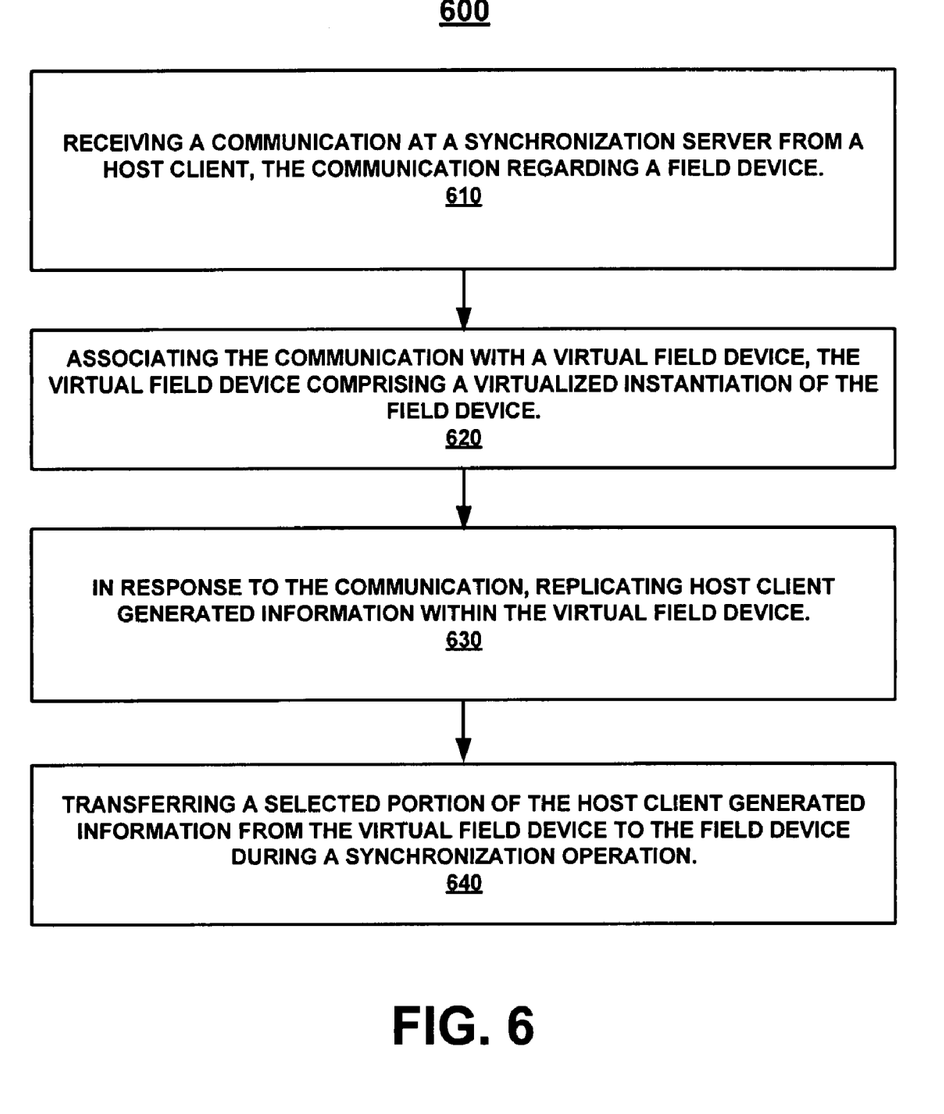
FIG. 6 is a flow diagram of an example method for transferring host client generated information between a host client and a field device, in accordance with one embodiment.

Transferring Host Client Generated Information Between a Host Client and a Field Device FIG. 6 is a flow diagram 600 of an example method for transferring host client generated information between a host client and a field device, in accordance with one embodiment. The method of flow diagram 600 utilizes system 400 to affect the exchange of host client generated information between a host client and a field device. In some instances a user may initiate the exchange. However, such data exchange may be automated, such that it is seamlessly carried out with little or no involvement from a user. An example exchange of information between host client 220B and field device 251 will be described below to illustrate the exchange of data which takes place, in some embodiments, utilizing the method described by flow diagram 600.

At 610 of flow diagram 600, in one embodiment, a communication is received at a synchronization server. The communication is received from a host client and is regarding or directed to a filed deceive. For example, in one embodiment, a communication from host client 220B is received by host client transceiver 460 of synchronization server 401. Such a communication may be initiated manually, automatically, or periodically from host client 220B. In one embodiment, the received communication may be a communication regarding/directed to a field device such as: a surveying data collection instrument, a geographic information system (GIS) data collection instrument, a global navigation satellite system (GNSS) data collection instrument, a construction machine control system, or another field device.

In one embodiment, for example, a communication regarding field device 251 is received at synchronization server 401 from host client 220B. In one instance, such a received communication comprises unique identifier information associated with the field client it is in regards/directed to. For example, a communication regarding field device 251 includes unique identifier information associated with field device 251. This may be a unique code or even a name, such as "Bob's surveying unit," which is associated with the field client. This is useful when system 400 is coupled with or capable of coupling with a plurality of field clients associated with or resident upon one of a plurality of field devices. As will be further described, the unique identifier information is used to associate a received communication with the proper virtual field device.

At 620 of flow diagram 600, in one embodiment, the received communication is associated with a virtual field device. The virtual field device comprises a virtualized instantiation of the field device which the communication is regarding. For example, in an embodiment where the received communication is regarding field device 251, synchronization manager 215 directs the received communication to virtual field device 241, because virtual field device 241 is the virtualized instantiation of field device 251.

In one embodiment, synchronization manager 215 "associates" a received communication by resolving an identity of the field device which the communication is in regards/directed to. For example, in one instance, synchronization manager 215 utilizes identity resolver 217 to analyze unique identifier information included with the received communication. In a manner previously described, identity resolver 217 identifies a field device which the communication regards and correlates this communication with a virtualized instantiation of that field device. Based upon this identity, synchronization manager 215 then associates the communication with the proper virtual field device. Typically, this comprises associating the received communication with one of a plurality of unique virtual field devices which are accessible by synchronization server 401.

At 630 of flow diagram 600, in one embodiment, in response to the received communication, host client generated information received from the host client is replicated within the virtual field device. The host client information may be sent from the host client, or may be retrieved from the host client by synchronization manager 215. The act of replicating host client generated information within a field client is one part of a host client to virtual field device synchronization operation. Thus, following the previous example, in one embodiment synchronization manager 215 automatically initiates a synchronization operation between host client 220B and virtual field device 241. During this synchronization operation, any host client generated information which resides within (or is sent from) host client 220B, and is regarding field device 251, is received in and replicated in virtual field device 241.

The received host client generated information may comprise: a work order; a message sent to a field client operator; a software update for the field client; a map, or any other host client generated information described herein. For instance, this can comprise synchronization manager 215 receiving a work order for field device 251 via host client transceiver 460. Synchronization manager 215 then supervises the loading or storing the data and/or files of the work order into locations of virtual field device 241 which are synonymous with like locations within field device 251 where the information of this work order should be stored.

The received work order (or other received host client generated information) is then presented for access via virtual field device 241, such that the work order is accessible to field device 251 during a subsequent synchronization operation involving field client 252 and virtual field device 241. In one embodiment, presenting the host client generated information for access comprises synchronization manager 215 sending a message to a user of a field device, or to a field client, as a notification that field collected data is available for access via virtual field device 241. In another embodiment, presenting the host client generated information for access comprises initiating, or attempting to initiate, a field client to virtual field device synchronization operation so that the all or a portion of the received host client generated information may be transferred to the field client. Such a synchronization operation may be initiated automatically upon receiving new host client generated information or in conjunction with a synchronization instruction contained in instruction store 216.

At 640 of flow diagram 600, in one embodiment, a selected portion of the host client generated information is transferred from the virtual field device to the field device which the host client generated information is regarding. This transfer takes place during a synchronization operation involving a field client and the virtual field device. Thus, following the previous example, all or some selected portion of the host client generated information, which has been replicated upon virtual field device 241, is transferred, via field client transceiver and field client 252, to field device 251. This transferred host client generated information is stored in locations synonymous with the locations which the in host client generated information was stored at within virtual field device 241. It is appreciated, that in one embodiment, during this field client to virtual field device synchronization operation, synchronization manager 215 also receives field collected data from the field device. Thus during a synchronization operation between field client 252 and virtual field device 241, host client generated information (such as a work order) is transferred to field device 251. During the same synchronization operation, field client information from field device 251 may be replicated within virtual field device 241.

Exchanging Data Between a Field Device and a Virtual Field Device

Figure 7:
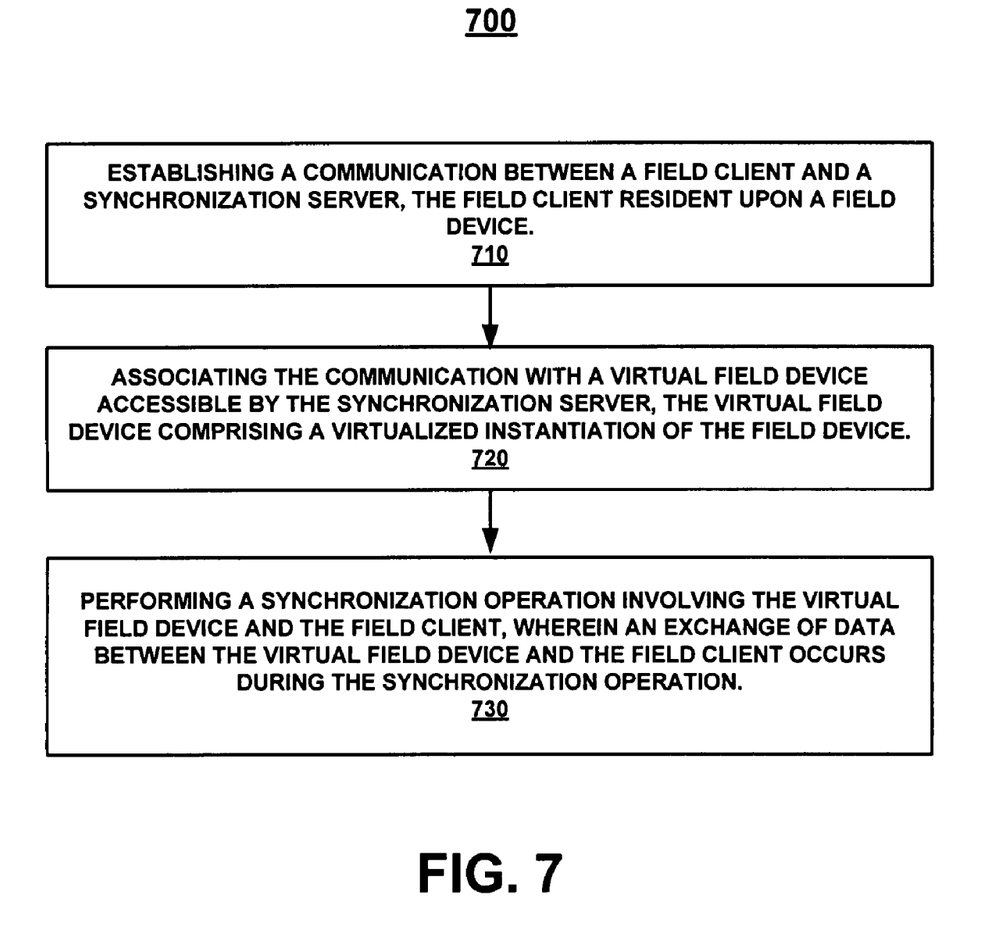
FIG. 7 is a flow diagram of an example method for exchanging data between a field device and a virtual field device, in accordance with one embodiment.

FIG. 7 is a flow diagram 700 of an example method for exchanging data between a field device and a virtual field device, in accordance with one embodiment. The method of flow diagram 700 utilizes system 400 to affect the exchange of host data between a field device and a virtual field device. In some instances a user may initiate the exchange. However, such data exchange may be automated, such that it is seamlessly carried out with little or no involvement from a user. An example exchange of information between field device 253 and virtual field device 243 will be described below to illustrate the exchange of data which takes place, in some embodiments, utilizing the method described by flow diagram 700.

At 710 of flow diagram 700, in one embodiment, a communication is established between a field client and a synchronization server. The field client is resident upon or associated with a single field device. For example, in one embodiment, this comprises establishing a communication between field client 254 and synchronization manager 215 of synchronization server 401. As previously described herein, such as communication may be initiated manually, automatically (such as upon a signal path being available), or periodically.

At 720 of flow diagram 700, in one embodiment, the communication is associated with a virtual field device that is accessible by the synchronization server. The virtual field device comprises a virtualized instantiation of the field device that the field client is resident on or associated with. Following the previous example, in one embodiment, this comprises, synchronization manager 215 associating the communication from field client 254 with virtual field device 243, because virtual field device 243 is a virtualized instantiation of field device 253.

In some embodiments, synchronization manager 215 utilizes identity resolver 217 to resolve the identity of a field device that the received communication is coming from or regarding. As previously explained, identity resolver may use identifier information, such as a code or a name (such as "Joe's survey device") to associate the received communication with a field device. Based upon the identity of the field device, synchronization manager 215 then associates the communication with the proper virtual field device. Typically, the virtual field device is one of a plurality of unique virtual field devices (e.g., 241, 243, 245) accessible by synchronization server 401.

At 730 of flow diagram 700, in one embodiment, a synchronization operation is performed. The synchronization operation involves the virtual field device and the field client. An exchange of data between the virtual field device and the field client occurs during the synchronization operation. Thus in one embodiment, in accordance with the continuation of the previous example, a synchronization operation involving field client 254 and virtual field device 243 occurs. During this synchronization operation, virtual field device 243 is synchronized with field client 254 such that field collected data from field device 253 is replicated within virtual field device 243 at like locations (e.g., at locations within storage, registers, files, and/or applications of virtual field device 243 which are synonymous with locations in field device 253). If any conflicts arise during the synchronization operation, such as a conflict due to co-located or mutually updated co-located file, synchronization manager 215 utilizes conflict resolver 218 to resolve the conflict(s) in a manner previously described herein.

It is appreciated that during the synchronizing operation involving field client 254 and virtual field device 243, additional information may be exchanged such that some or all updated host client generated information which resides upon virtual field device 243 is sent, via field client transceiver 460 and field client 254, to field device 253. The updated host client generated information is provided to virtual field device 243 by a host client, such as host client 220B which is coupled, or has previously coupled, with synchronization server 401 during a host client to virtual field device synchronization operation.

Following the field client to virtual field device synchronization operation, the synchronized field collected data which is replicated within virtual field device 243 is then presented for access, such that the field collected data is accessible to a host client, such as host client 220B or host client 220C. For example, as previously described, such field collected data may be transferred to a host client during a host client to virtual field device synchronization operation.

Embodiments of the present technology are thus described. While the present technology has been described in particular embodiments, it should be appreciated that the present technology should not be construed as limited by such embodiments, but rather construed according to the following claims.

I claim:
1. A system for synchronizing data between a host client and a field device, said system comprising:
   a computer system;
   a virtual field device resident on said computer system, said virtual field device comprising a virtualized instantiation of a portion of a field device;
   a synchronization manager resident on said computer system, said synchronization manager configured for managing synchronization operations involving said virtual field device;
   a field client transceiver coupled with said synchronization manager, said field client transceiver configured for facilitating data exchange between said virtual field device and said field device during a field client to virtual field device synchronization operation; and
   a host client resident on said computer system, said host client configured for exchanging data with said virtual field device during a host client to virtual field device synchronization operation,
   wherein said exchanging includes sending a work order generated by the host client to the virtual field device, and said work order comprises collections of files that instruct a user of the field device to collect needed data from a work site.

2. The system of claim 1, further comprising a coupling between said field client transceiver and at least one field client.

3. The system of claim 1, further comprising:
a plurality of virtual field devices resident on said computer system, each of said plurality of virtual field devices comprising a virtualized instantiation of one of a plurality of field devices.

4. The system of claim 1, wherein said synchronization manager comprises:
an instruction store for storing a synchronization instruction, said synchronization instruction governing said field client to virtual field device synchronization operation.

5. The system of claim 4, wherein said synchronization manager comprises:
an identity resolver configured for associating a received field client communication with a particular virtual field device of a plurality of virtual field devices.

6. The system of claim 5, wherein said identity resolver is further configured for associating a received host client communication with a particular virtual field device of said plurality of virtual field devices.

7. The system of claim 1, wherein said synchronization manager comprises:
a conflict resolver, said conflict resolver configured for resolving a conflict occurring during one of said synchronization operations, said conflict due to a mutually updated co-located file.

8. A method for exchange of data between a field device and a virtual field device, said method comprising:
establishing a communication between a field client and a computer system, said field client residing on a field device;
associating said communication with a virtual field device residing on said computer system, said virtual field device comprising a virtualized instantiation of said field device; and
performing a synchronization operation involving said virtual field device and said field client, wherein an exchange of data between said virtual field device and said field device occurs during said synchronization operation, wherein said field client is synchronized with said virtual field device such that updated information on said virtual field device is sent to said field device, wherein said updated information is provided to said virtual field device by a host client located on said computer system, and wherein said updated information comprises a work order generated by the host client, and said work order comprises collections of files that instruct a user of the field device to collect needed data from a work site.

9. The method as recited in claim 8, wherein said establishing a communication between a field client and a computer system comprises:
establishing said communication between said field client and a synchronization manager of said computer system.

10. The method as recite in claim 8, wherein said associating said communication with a virtual field device residing on said computer system comprises:
resolving an identity of said field device.

11. The method as recited in claim 10, wherein said associating said communication with a virtual field device residing on said computer system further comprises:
based upon said identity of said field device, associating said communication with said virtual field device, wherein said virtual field device is one of a plurality of unique virtual field devices residing on said computer system.

12. The method as recited in claim 8, wherein said performing a synchronization operation involving said virtual field device and said field client further comprises:
synchronizing said virtual field device with said field client such that field collected data resident on said field device is replicated within said virtual field device.

13. The method as recited in claim 12, wherein said synchronizing said virtual field device with said field device such that field collected data residing on said field device is replicated within said virtual field device further comprises:
presenting said field collected data for access via said virtual field device such that said field collected data is accessible to a host client of said computer system.

14. The method as recited in claim 8, wherein said performing a synchronization operation involving said virtual field device and said field client comprises:
resolving a conflict due to a mutually updated co-located file, said co-located file residing on both of said virtual field device and said field device.

* * * * *